Dec. 25, 1934.　　　　　J. M. SEARS　　　1,985,464
DEVICE FOR MAINTAINING VEGETABLES FRESH
Filed Aug. 29, 1933　　　2 Sheets-Sheet 1
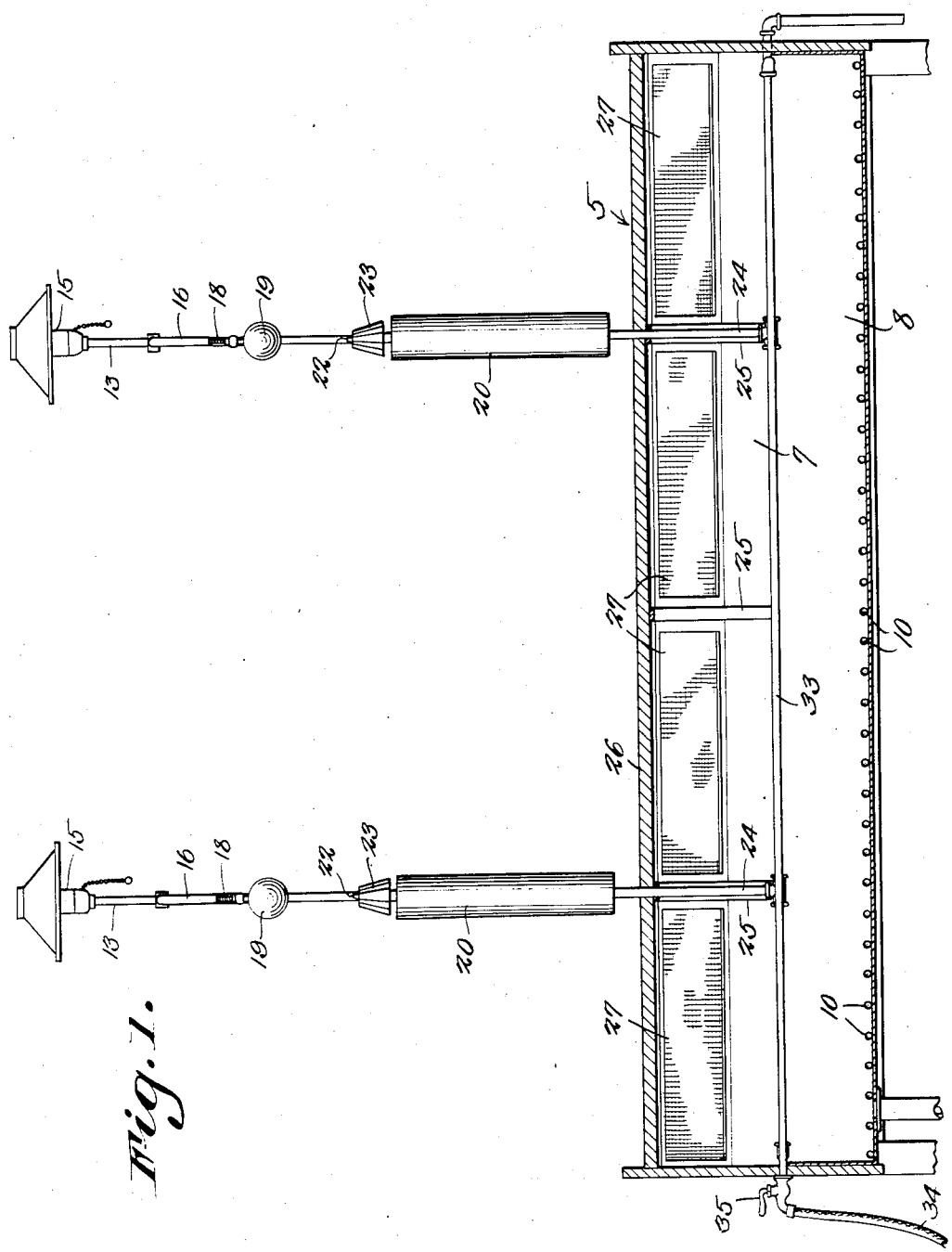
J. M. Sears Inventor
By C. A. Snow & Co.
Attorneys.

Dec. 25, 1934. J. M. SEARS 1,985,464
DEVICE FOR MAINTAINING VEGETABLES FRESH
Filed Aug. 29, 1933 2 Sheets-Sheet 2
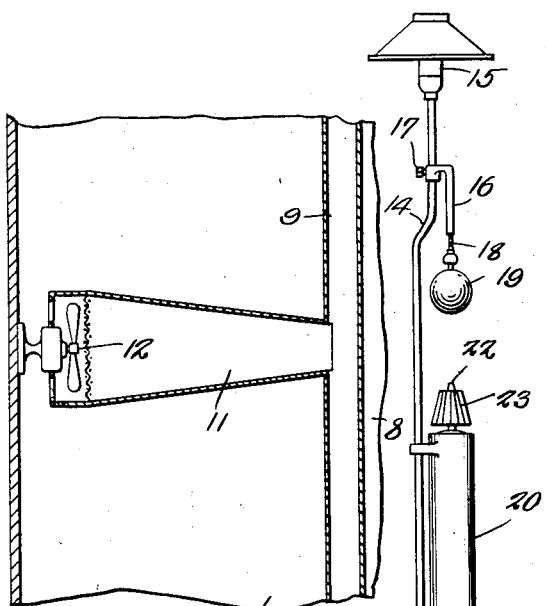
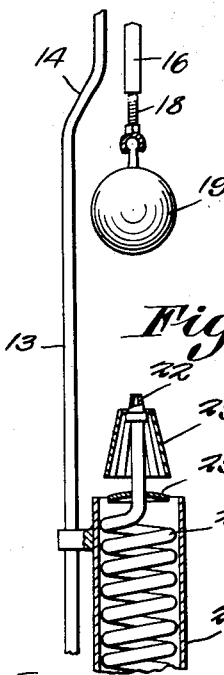
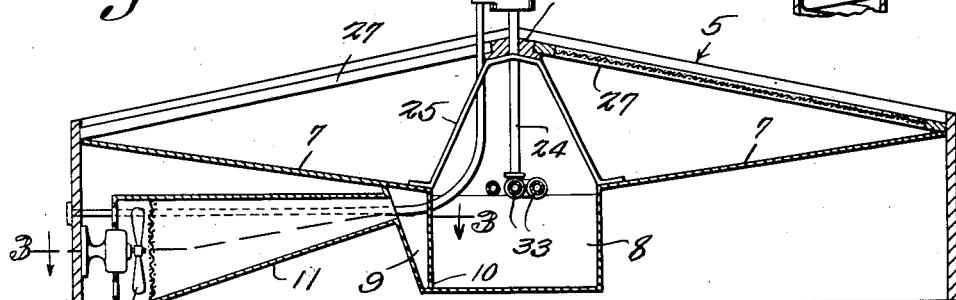
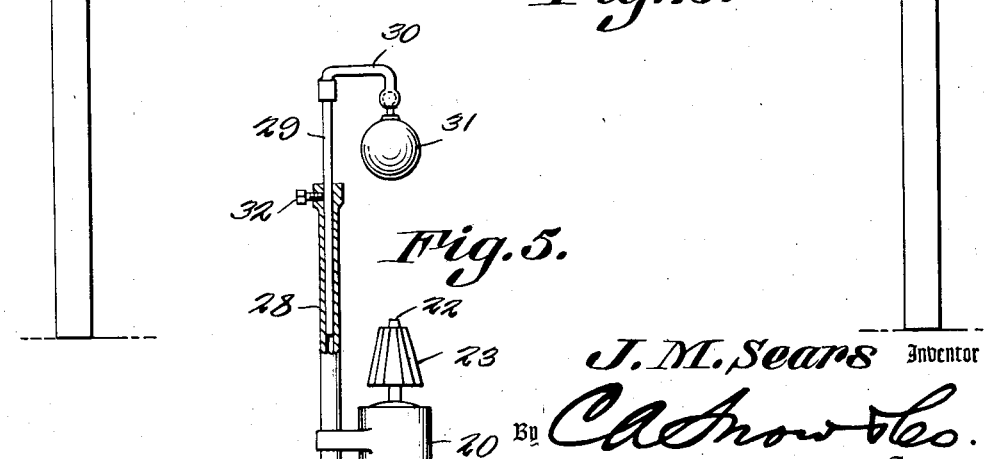
J. M. Sears Inventor Patented Dec. 25, 1934

1,985,464

UNITED STATES PATENT OFFICE 1,985,464

DEVICE FOR MAINTAINING VEGETABLES FRESH

Joseph M. Sears, San Antonio, Tex.

Application August 29, 1933, Serial No. 687,347

1 Claim. (Cl. 211—127)

This invention relates to vegetable stands, the primary object of the invention being to provide a vegetable stand having means for maintaining the vegetables in a fresh condition at all times, eliminating the use of ice or other refrigerating means.

The primary object of the invention is to provide means for converting a fine stream of water into a vapor, the vapor being controlled in such a way that the vapor will fall onto the vegetables contained in the compartments of the stand supplying the necessary moisture to the vegetables, to keep the vegetables fresh.

A further object of the invention is to provide means for directing air upwardly through the vegetable stand, means being provided for cooling the air prior to its passage through the compartments of the stand, in which the vegetables are contained.

With the foregoing and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:

Figure 1 is a longitudinal sectional view through a vegetable stand equipped with a freshening device constructed in accordance with the invention.

Figure 2 is a transverse sectional view therethrough.

Figure 3 is a sectional view taken on line 3—3 of Figure 2.

Figure 4 is a fragmental detail view illustrating the coil and nozzle, through which water is directed.

Figure 5 is a view illustrating a modified form of vapor producing mechanism.

Referring to the drawings in detail, the device is shown as used in connection with a vegetable stand having horizontal bins for containing the vegetables, the bins being indicated by the reference character 5.

These bins 5 form a part of the stand frame indicated at 6, and have downwardly inclined bottoms 7 that lead to a trough 8 disposed longitudinally of the stand, and arranged centrally thereof.

Extending longitudinally of the trough at one side thereof, is a compartment 9 that communicates with the trough 8, through the openings 10 formed adjacent to the lower edge of one side wall of the trough 8, as clearly shown by Figure 2 of the drawings.

The reference character 11 designates a substantially tubular member, the tubular member tapering towards the discharge end thereof, or where the tubular member connects with the compartment 9 so that air forced through the tubular member, will be confined to a comparatively small area as the air passes into the compartment 9, thereby increasing the pressure of the air at this point.

An electric fan indicated by the reference character 12, is mounted within one end of the tubular member 11 so that air will be forced through the tubular member 11, as the fan rotates within its housing.

The reference character 13 designates a pipe that extends through an opening in the trough 8, from where it passes laterally through an opening in the frame, supporting the pipe in an upright position.

This pipe is of a length to extend upwardly an appreciable distance above the bin or table, where it is provided with an offset portion 14, and lamp 15.

Adjustably mounted on the pipe 13, and disposed above the offset portion 14 thereof, is a vertically adjustable arm 16 held in its positions of adjustment, by means of the bolt 17.

This arm 16 is formed with a threaded bore to receive the threaded shank 18, that in turn provides a support for the ball 19, so that the ball may be adjusted vertically with respect to the arm 16.

Supported by the pipe 13, is a tubular housing 20 formed with open ends, the housing 20 being disposed directly above the vegetable stand, so that water may drain onto the vegetables held in the bins of the stand.

Mounted in the housing 20, is a coiled pipe 21 that has its upper end extended above the upper end of the housing 20, where it is provided with a nozzle 22 that directs a fine stream of water against the ball 19, and when this fine stream of water strikes the ball 19, the fine stream of water is broken up into a fine mist or vapor, maintaining the air in a moist condition.

Surrounding the nozzle 22, is a head 23 formed with a corrugated outer surface providing grooves through which moisture may gravitate to the housing 20.

Directly under the head 22, is a disk 23' that acts to spread the drops of moisture passing from the head 23. This coil 21 is connected with a suitable source of water supply, through the pipe 24, that is shown as extended under the vegetable stand.

Arranged within the bins, are bracket members 25, which support the bar 26 formed with grooves disposed along its longitudinal edges, which grooves provide rests for the bottom members 27 that are constructed of foraminous material. These bottom members provide supports for the vegetables held in the bins, and provide means whereby a circulation of air through the bins and vegetables, will be permitted at all times.

It will of course be understood that pipe 24 connects with the supply pipe 33 that is in communication with a suitable source of water supply. A hose indicated at 34 connects with the spigot 35, at one end of the pipe 33, whereby the bins may be thoroughly cleaned.

In the modified form of the invention as shown by Figure 5 of the drawings, the pipe 28 is shown as hollow to receive the rod 29 forming a right angled portion 30 that supports the ball 31.

A set screw 32 is provided for holding the rod 29 in its positions of adjustment.

From the foregoing it will be obvious that due to the construction shown and described, water in a fine spray or vapor will be supplied to the air above the vegetables contained on the vegetable stand, maintaining the vegetables fresh at all times.

It might be further stated that although the electric fan operates slowly, the air passing upwardly will act to carry moisture that is returned to the trough 8, upwardly to the fresh vegetables held on the stand.

Having thus described the invention what is claimed is:

A display stand for displaying perishable fruits and vegetables, comprising a frame, foraminous supporting members on the frame, a trough extending longitudinally of the frame intermediate the sides of the frame, said trough having a lateral longitudinal compartment and having openings establishing communication between the compartment and trough, a tubular member communicating with the compartment near the trough of the compartment, and a blower in one end of the tubular member to force air through the compartment, trough and foraminous supporting members.

JOSEPH M. SEARS.